Aug. 13, 1940.  A. E. BRICKMAN ET AL  2,211,615
TERMINAL CONNECTION FOR ELONGATED FLEXIBLE INTERCONNECTING MEMBERS
Filed May 22, 1939
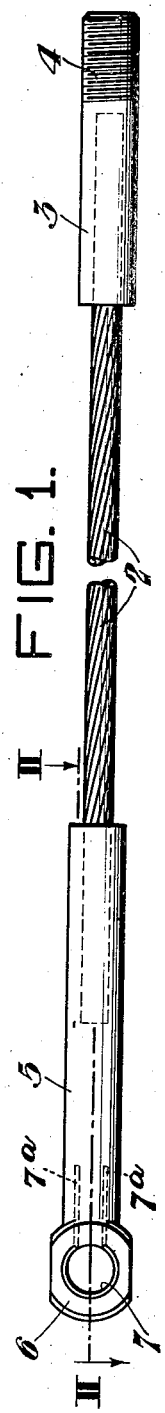
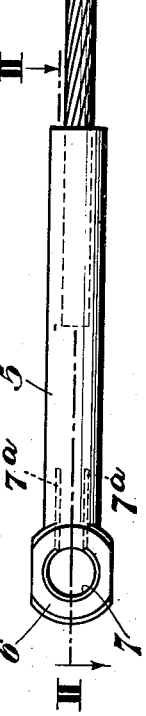
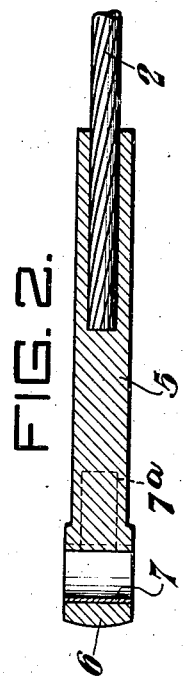
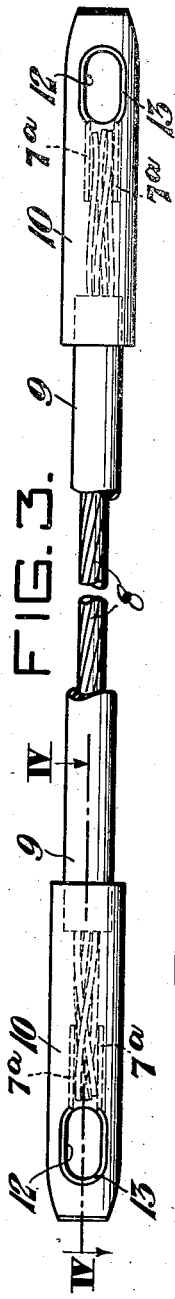
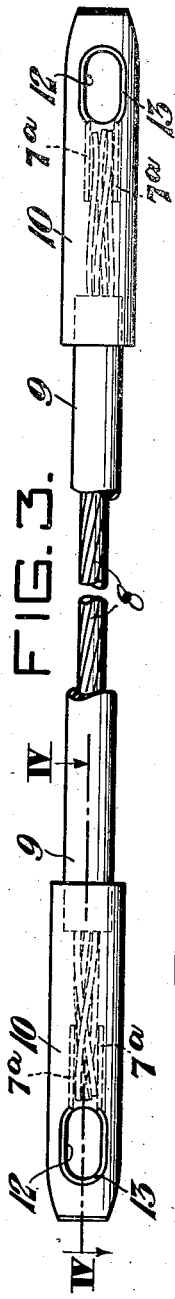
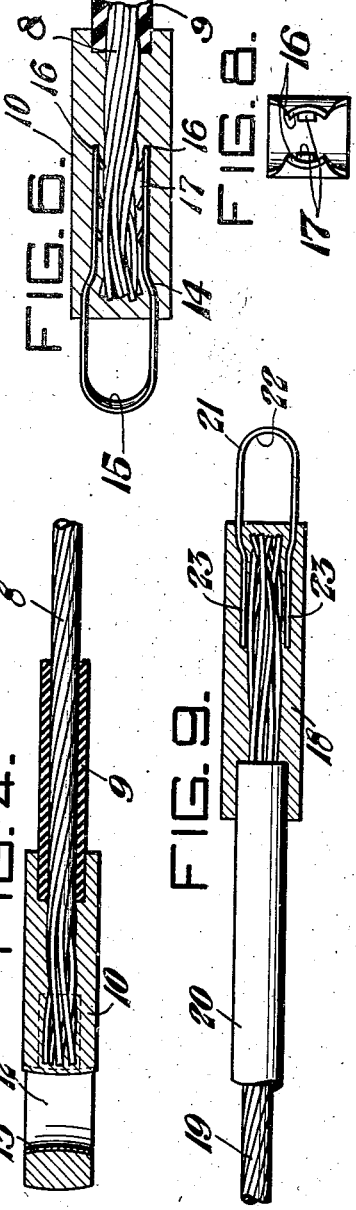
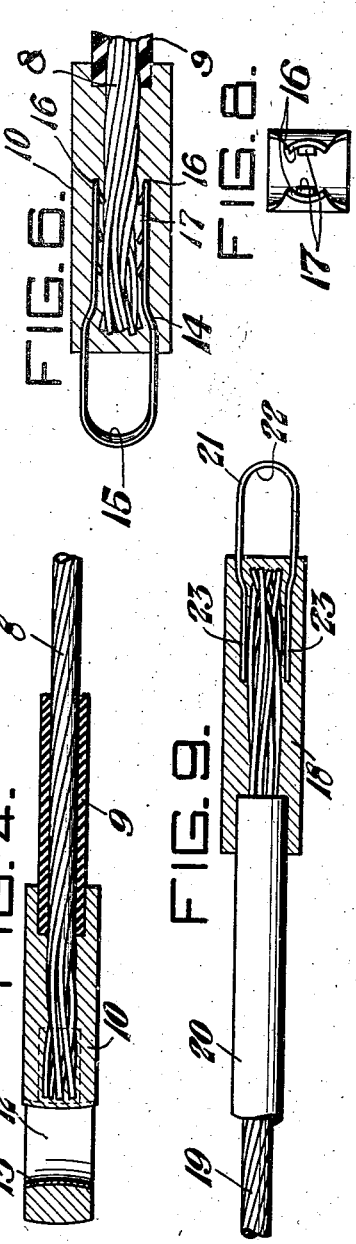
Inventors:
ALAN E. BRICKMAN and
GEORGE A. GLEASON.
by John E. Jackson
their Attorney.

Patented Aug. 13, 1940

2,211,615

UNITED STATES PATENT OFFICE 2,211,615

TERMINAL CONNECTION FOR ELONGATED FLEXIBLE INTERCONNECTING MEMBERS

Alan E. Brickman, Rostraver Township, Westmoreland County, Pa., and George A. Gleason, Worcester, Mass., assignors to The American Steel and Wire Company of New Jersey, a corporation of New Jersey Application May 22, 1939, Serial No. 275,074

8 Claims. (Cl. 24—123)

This invention relates to elongated flexible interconnecting members, such as brake cables, harness or dobby cords for looms, and the like, and particularly to an improved terminal connection therefor.

Various types of terminal connections for elongated flexible interconnecting members, such as brake cables and dobby cords, have been suggested and used, but most of these have been unsatisfactory, in that, they would become detached from the end of the cable or cord; or the terminal would wear and break, thereby making the cable or cord useless; oftentimes, too, the terminal connection was too large and bulky, thereby rendering it unsatisfactory for the particular purpose for which the cable or cord was intended.

It has been proposed heretofore to provide a die-cast terminal on the end of such flexible interconnecting members, but difficulty has been experienced in the use of such a terminal for the reason that the metal used in die-casting these terminals is inherently soft relative to other metals and the die-cast terminal would soon wear through or fracture after a short time in service, thereby rendering the flexible member to which it was attached unfit for further service.

The present invention relates particularly to a means for remedying this undue wearing of die-cast terminal connections so as to overcome the above mentioned disadvantage.

Accordingly, it is one of the objects of the present invention to provide an improved die-cast terminal connection for flexible interconnecting members which will materially increase the life thereof.

It is another object of the invention to provide an improved die-cast terminal connection for flexible interconnecting members having a connecting portion associated therewith which is simple and inexpensive in its construction and, yet, one which is strong and rugged.

It is a further object of the present invention to provide an improved die-cast terminal connection for flexible interconnecting members having the connecting portion thereof formed of a wear-resisting reenforcing metallic material integrally connected thereto, thereby not subjecting the metal of the die-cast terminal to any wear whatsoever.

Various other objects and advantages of our invention will be more apparent in the course of the following specification and will be particularly pointed out in the appended claims.

In the accompanying drawing there is shown, for the purpose of illustration, one embodiment and several modifications thereof which our invention may assume in practice.

In the drawing:

Figure 1 is a plan of a conventional brake cable showing the improved terminal connection of our invention incorporated therewith;

Figure 2 is a section taken on the line II—II of Figure 1;

Figure 3 is a plan of a harness or dobby cord incorporating the use of the improved terminal connection of our invention;

Figure 4 is a section taken on the line IV—IV of Figure 3;

Figure 5 is a side elevation of a reenforcing insert which may be used in the practice of the present invention;

Figure 6 is a longitudinal section similar to Figure 4 showing the modified form of reenforcing member as shown in Figure 5 incorporated with the die-cast terminal connection;

Figure 7 is an end view of the reenforcing insert as shown in Figure 5;

Figure 8 is a view similar to Figure 7 showing a slight modification; and,

Figure 9 is a longitudinal section similar to Figure 4 showing a modified construction of a die-cast terminal connection of the present invention.

Referring more particularly to the drawing, there is shown in Figure 1 the improved terminal connection of our invention incorporated with a brake cable. Such a cable consists of a multi-strand flexible wire cable 2 having a suitable terminal connection 3 on one end thereof which has an outer threaded portion 4. On the opposite end of the flexible cable 2, there is arranged a slightly different type of terminal connection 5 having an eye connecting portion 6 arranged therein adjacent the outer end thereof for receiving a pin or other suitable connecting means. Both of the end terminals 4 and 5 are die-cast on their respective ends of the cable 2 enveloping the ends of the strands thereof and thereby being securely attached thereto.

According to the present invention, there is arranged in the eye connecting portion 6 of the die-cast terminal connection 5, a wear-resisting metallic reenforcing or insert member 7. This metallic reenforcing or insert member is positioned in the die at the time of the die-casting of the terminal connection and is securely embedded in the metal due to the die-casting of the metal therearound. The type of metallic insert shown, and preferable for use, is substantially U-shaped, having its ends or leg portions 7a extending inwardly toward the center of the cable and being securely embedded in and enveloped by the die-cast metal. It will be understood that it is the purpose of this metallic insert member 7 to provide a reenforcing means for the terminal and wear-resisting side walls for the eye portion 6 of the die-cast terminal connection.

In Figure 3, the improved die-cast terminal connection of our invention is shown incorporated with a dobby or harness cord as used in looms. Such a dobby or harness cord comprises an elongated flexible member of a predetermined length consisting of a multi-strand wire cable 8 preferably sheathed in flexible moisture-proof material 9, such as rubber and the like. In a harness or dobby cord, the terminal connections on the ends thereof are usually of the same construction, with one terminal connection adapted to be attached to the hooked end of a horizontally actuated jack or lever of the loom and disposed over a sheave with the opposite end thereof attached to a hook arranged in the top of a vertically disposed harness frame of the loom. In the present instance, a portion of the sheathing 9 of the cable is removed from each end thereof and similar die-cast terminal connections 10 are disposed on each end thereof with each having an eye connecting portion 12 arranged on the outer end thereof for connecting the dobby or harness cord to the hooked end of the jack and the hook carried by the frame, as previously described.

Each of the die-cast terminals 10 envelopes the ends of the strands of the wire cable and extends over the outer end of the sheathing thereof so as to overlap and envelope the same. In the present invention, there is disposed in the eye connecting portion 12 of each of the terminal connections 10, a suitable substantially U-shaped wear-resisting metallic reenforcing or insert member 13 similar to the insert member 7. The insert connecting member 13 is likewise securely embedded in the metal of the die-cast end and is arranged therein for the purpose of providing a reenforcing means for the terminal and wear-resisting side walls for the eye portions 12; that is, side walls against which the hooked ends of the jack and the harness frame are adapted to function. In this construction, it will be noted that ends of the wire strands extend to a point up between the legs of the U-shaped insert or reenforcing member almost to the end of the die-cast portion of the terminal.

In Figures 5, 6 and 7 there is shown a type of insert or reenforcing member which is preferable for use in the present invention. Such an insert consists of a U-shaped body member 14 formed preferably of flat strip metal having an arcuate-shaped wall 15 formed in the outer side thereof so as to provide a better bearing surface for the hook it is adapted to receive. The opposed walls of legs 16 have inwardly extending teeth 17 arranged thereon which are struck up from the metal. These teeth are adapted to temporarily hold the insert or reenforcing member in position on the end of strands of the wire until the ends thereof, together with the insert, are positioned in the die and the terminal member die-cast therearound. Also, the die-cast metal will flow into the opening in the legs from which the teeth 17 are formed, thereby tending to provide a better bond between the legs and the die-cast metal. The legs 16 may be arcuate-shaped in cross section, if desired, as shown in Figure 8, so as to fit around the ends of the wire strands, thereby tending to more effectively retain the ends of the same therebetween.

In Figure 9 there is shown a modified form of a die-cast terminal connection of the present invention which may be incorporated with a brake cable, harness cord, or any other suitable interconnecting flexible member. In this construction, the terminal connections consist of a die-cast body portion 18 which, as before, envelopes the ends of the strands of the wire cable 19 and overlaps and envelopes the end of the moisture-proof sheathing 20. However, in this construction, the connecting eye portion of the terminal connection extends outwardly from the end of the die-cast body portion 18 and consists of a metallic member 21 similar to insert member 7 and 13 bent into substantially a U-shape so as to form an eye portion 22 in the end thereof which is adapted to receive a hook, pin, or other suitable connecting means and having its legs 23 securely embedded in and enveloped by the metal of the die-cast body portion 18 of the terminal around the ends of the wire strands so as to be securely attached thereto.

As a result of this invention, it will be seen that there is provided a die-cast terminal connection for elongated flexible members so as to obtain all of the advantages that a die-cast terminal connection possesses and, in addition, means for overcoming one big disadvantage thereof, namely, its inherent characteristic of being non-resistant to wear. That is, the part thereof which is subjected most to wear is provided with a wear-resisting or reenforcing metallic member which materially increases the life of such die-cast terminal connections, thereby eliminating the frequent replacing of the flexible interconnecting members.

While we have shown and described one embodiment of our invention and several modifications thereof, it will be understood that these embodiments are merely for the purpose of illustration and description and that various other forms may be devised within the scope of our invention, as defined in the appended claims.

We claim:

1. The combination with an elongated multi-strand flexible member, of a die-cast terminal member disposed on at least one end of said flexible member enveloping the ends of the strands thereof, and a reenforcing connecting eye member of wear-resisting material associated with said terminal member which is securely die-cast therein adjacent the end thereof so as to provide a connecting eye portion therefor.

2. The combination with an elongated multi-strand flexible metallic member, of a die-cast terminal member disposed on at least one end of said flexible member enveloping the ends of the strands thereof, said terminal member having a connecting eye portion arranged therethrough adjacent the outer end thereof, and a wear-resisting reenforcing insert member securely arranged within said eye portion so as to provide wear-resisting side walls therefor.

3. The combination with an elongated multi-strand flexible member, of a die-cast terminal member disposed on at least one end of said flexible member enveloping the ends of the strands thereof, said terminal member having a connecting eye portion arranged therethrough adjacent the end thereof, a U-shaped wear-resisting reenforcing insert member arranged within the eye portion of said terminal member so as to provide wear-resisting side walls therefor, said U-shaped insert member having its ends embedded in said die-cast terminal member so as to be securely retained therein.

4. The combination with an elongated multi-strand flexible member, of a die-cast terminal member disposed on at least one end of said flexible member enveloping the ends of the strands thereof, and a reenforcing connecting eye member of substantially U-shape arranged in the outer end of said terminal member and extending outwardly therefrom, said eye member formed of a wear-resisting material and having its leg portions embedded in said die-cast terminal member and enveloped thereby so as to be securely attached thereto.

5. The combination with an elongated flexible member of a predetermined length consisting of a multi-strand flexible wire sheathed in a flexible moisture-proof material having a portion of said sheathing removed from at least one end thereof, of a die-cast terminal member disposed on said end developing both the end of the strands of said flexible member and the end of said sheathing, said terminal member having a connecting eye portion arranged in the outer end thereof, and a wear-resisting metallic reenforcing insert member disposed within said eye portion and embedded in said die-cast terminal member so as to provide wear-resisting side walls for said eye portion.

6. The combination with an elongated flexible member of a predetermined length consisting of a multi-strand flexible wire sheathed in a flexible moisture-proof material having a portion of said sheathing removed from at least one end thereof, of a die-cast terminal member disposed on said end enveloping both the end of the strands of said flexible member and the end of said sheathing, said terminal member having a connecting eye portion arranged in the outer end thereof, and a U-shaped wear-resisting metallic reenforcing insert member disposed within the eye portion of said die-cast terminal member so as to provide wear-resisting side walls therefor, said insert member having its leg portions embedded in said die-cast terminal member so as to be securely retained therein.

7. The combination with an elongated flexible member of a predetermined length consisting of a multi-strand flexible wire sheathed in a flexible moisture-proof material having a portion of said sheathing removed from at least one end thereof, of a die-cast terminal member disposed on said end enveloping both the end of the strands of said flexible member and the end of said sheathing, and a connecting eye member of wear-resisting material arranged in the outer end of said die-cast terminal member and extending outwardly therefrom, said eye member having its inner end embedded in said die-cast terminal member and enveloped thereby so as to be securely attached thereto.

8. The combination with an elongated multi-strand flexible member, of a die-cast terminal member disposed on at least one end of said flexible member enveloping the ends of the strands thereof, a reenforcing U-shaped metallic connecting member arranged in the outer portion of said terminal member, said U-shaped connecting member having its leg portions embedded in the die-cast metal and having a plurality of teeth arranged on the opposed walls of the leg portions thereof which are adapted to grip the ends of the strands of said flexible member at least temporarily while the terminal is die-cast therearound.

ALAN E. BRICKMAN.
GEORGE A. GLEASON.